United States Patent [19]
Ueno et al.

[11] Patent Number: 5,283,622
[45] Date of Patent: Feb. 1, 1994

[54] DISTANCE MEASURING APPARATUS

[75] Inventors: Hiroshi Ueno, Yokohama; Haruhiko Iizuka, Yokosuka; Junichi Kasai, Yokohama, all of Japan

[73] Assignee: Nissan Motor Co., Ltd., Yokohama, Japan

[21] Appl. No.: 892,893

[22] Filed: Jun. 3, 1992

[30] Foreign Application Priority Data

Jun. 3, 1991 [JP] Japan .................................. 3-131282

[51] Int. Cl.⁵ .............................................. G01C 3/08
[52] U.S. Cl. ............................................ 356/4; 356/5
[58] Field of Search ........................................ 356/4, 5

[56] References Cited
U.S. PATENT DOCUMENTS

| | | | |
|---|---|---|---|
| 4,639,588 | 1/1987 | Shinoda | 356/4 X |
| 4,716,298 | 12/1987 | Etoh | 356/5 X |
| 4,786,164 | 11/1988 | Kawata | 356/4 |

FOREIGN PATENT DOCUMENTS 60-49278  3/1985  Japan.
60-76281  5/1985  Japan.

*Primary Examiner*—Mark Hellner
*Attorney, Agent, or Firm*—Lowe, Price, LeBlanc & Becker

[57] ABSTRACT

A distance measuring apparatus installed on a car for measuring the distance of the car from the one in front. The distance measuring apparatus comprises a laser generator for emitting a laser beam, a photosensor for receipt of the laser beam reflected from the car in front, means for calculating the distance between the cars when the photosensor receives the reflected laser beam, and a control unit for controlling an adjustable range of the emitted laser beam according to the calculated distance.

7 Claims, 5 Drawing Sheets

DISTANCE MEASURING APPARATUS

BACKGROUND OF THE INVENTION

This invention relates to a distance measuring apparatus installed on a vehicle for measuring the distance between the vehicle and the one in front.

For example, Japanese Patent Kokai No. 60-49278 discloses a distance measuring apparatus which employs a laser generating element for emitting a laser radiation beam having a constant intensity and a constant range available to measure the distance between the vehicle and the one in front. If the laser beam is set to radiate at a small angle so as to have a long available range, however, a vehicle running at a short distance ahead of the vehicle will deviate from the available range of the laser radiation beam. If the laser radiation beam is set to diverge at a large angle so as to have a short available range, a vehicle running at a great distance ahead of the vehicle will be out of the available range of the laser radiation beam.

Japanese Utility Model Kokai No. 60-76281 discloses a distance measuring apparatus adapted to swing the optical axis of the laser radiation beam emitted from a laser generating element so as to widen the available range of the laser radiation beam. However, it is very difficult to control the optical axis of the laser radiation beam in an appropriate manner since the distance measuring apparatus is subject to great vibrations. It may be considered to widen the available range of the laser radiation beam by providing a plurality of laser generating elements. However, this results in a complex and expensive distance measuring apparatus.

SUMMARY OF THE INVENTION

It is a main object of the invention to provide a simple and inexpensive distance measuring apparatus which can provide certain measurement of the distance between vehicles.

There is provided, in accordance with the invention, a distance measuring apparatus installed on a car for measuring the distance of the car from the one in front. The distance measuring apparatus comprises a laser generator for emitting a laser beam, a photosensor for receipt of the laser beam reflected from the car in front, means for calculating the distance between the cars when the photosensor receives the reflected laser beam, and a control unit for controlling an adjustable range of the emitted laser beam according to the calculated distance.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
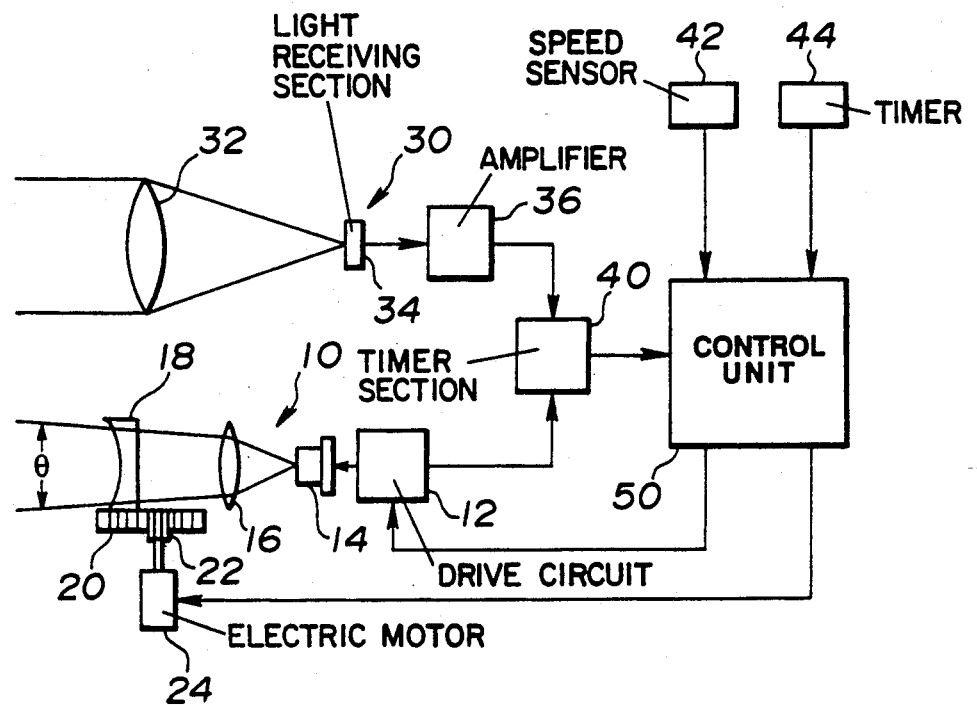
FIG. 1 is a schematic diagram showing one embodiment of a distance measuring apparatus made in accordance with the invention.

With reference to the drawings, and in particular to FIG. 1, there is shown a schematic diagram of a distance measuring apparatus embodying the invention. The distance measuring apparatus is installed on a car or vehicle and it includes a light emitting section 10, a light receiving section 30, a timer section 40 and a control unit 50. The light emitting section 10 includes a drive circuit 12 operable on command from the control unit 50 for producing a radiation control signal causing a laser generating element such as a semiconductor laser diode 14 to emit a laser radiation beam. The drive circuit 14 also produces an electric signal used as a first indication signal to indicate the emission of the laser radiation beam from the laser diode 14. The first indication signal is fed from the drive circuit 14 to the timer section 40. The laser radiation beam emitted from the laser diode 14 passes through a fixed convex lens 16 to a cylindrical lens 18 disposed in aligned relationship to the convex lens 16. The cylindrical lens 18 is carried fixedly on a rack 20 held in mesh engagement with a pinion 22. The pinion 22 is secured on the output shaft of an electric motor 24 so that the cylindrical lens 18 can move toward and away from the convex lens 16 with its optical axis being held in alignment with that of the convex lens 16 when the electric motor 24 is driven. The distance of the cylindrical lens 18 from the convex lens 16 determines the angle $\theta$ at which the laser radiation beam emitted from the laser diode 14 diverges and, thus, the range of the emitted laser radiation beam.

The light receiving section 30 includes a convex lens 32 to which the laser beam deflected from the vehicle in front is guided. The convex lens 32 focuses the deflected laser beam onto a photosensor 34 which converts the amplitude variations of the light impinging thereon into an electrical signal. This electrical signal, which is used as a second indication signal to indicate the receipt of the reflected laser beam, is fed from the photosensor 34 through an amplifier 36 to the timer section 40. The timer section 40 is arranged to calculate the period $\Delta T$ between the time at which the first indication signal is produced and the time at which the second indication signal is produced.

The control unit 50 employs the calculated time period $\Delta T$, along with the existing vehicle running speed V, to calculate the distance between the vehicle and the one in front. The angle $\theta$ at which the laser radiation beam emitted from the laser diode 14 diverges toward the one in front of the vehicle, this being determined by the distance of the cylindrical lens 18 from the convex lens 16, are repetitively determined from calculations performed by a digital computer. These calculations are based upon the distance between the vehicles and the existing vehicle running speed V. Thus, the control unit 50 receives inputs from the timer section 40 and a vehicle speed sensor 42. The control unit 50 also receives an input from a timer 44. The control unit 50 employs a digital computer which includes a central processing unit (CPU), a random access memory (RAM), a read only memory (ROM), and an input/output control circuit (I/O). The central processing unit communicates with the rest of the computer via data bus. The read only memory contains the program for operating the central processing unit and further contains appropriate data used in calculating appropriate values for the intensity of the laser radiation beam to be emitted from the laser diode 14 and the angle $\theta$ at which the emitted laser radiation beam is to diverge toward the one in front of the vehicle. Control words specifying desired laser radiation beam intensity and diverging angle are periodically transferred by the central processing unit to the input/output control circuit which converts the received control words into control signals for application to the drive circuit 12 and the electric motor 24. The drive circuit 12 drives the laser diode 14 to produce a laser radiation beam having the intensity calculated by the central processing unit and also produces the first indication signal to the timer section 40. The electric motor 24 rotates to move the cylindrical lens 18 with respect to the convex lens 14 if desired to obtain the diverging angle calculated by the central processing unit.

Figure 2:
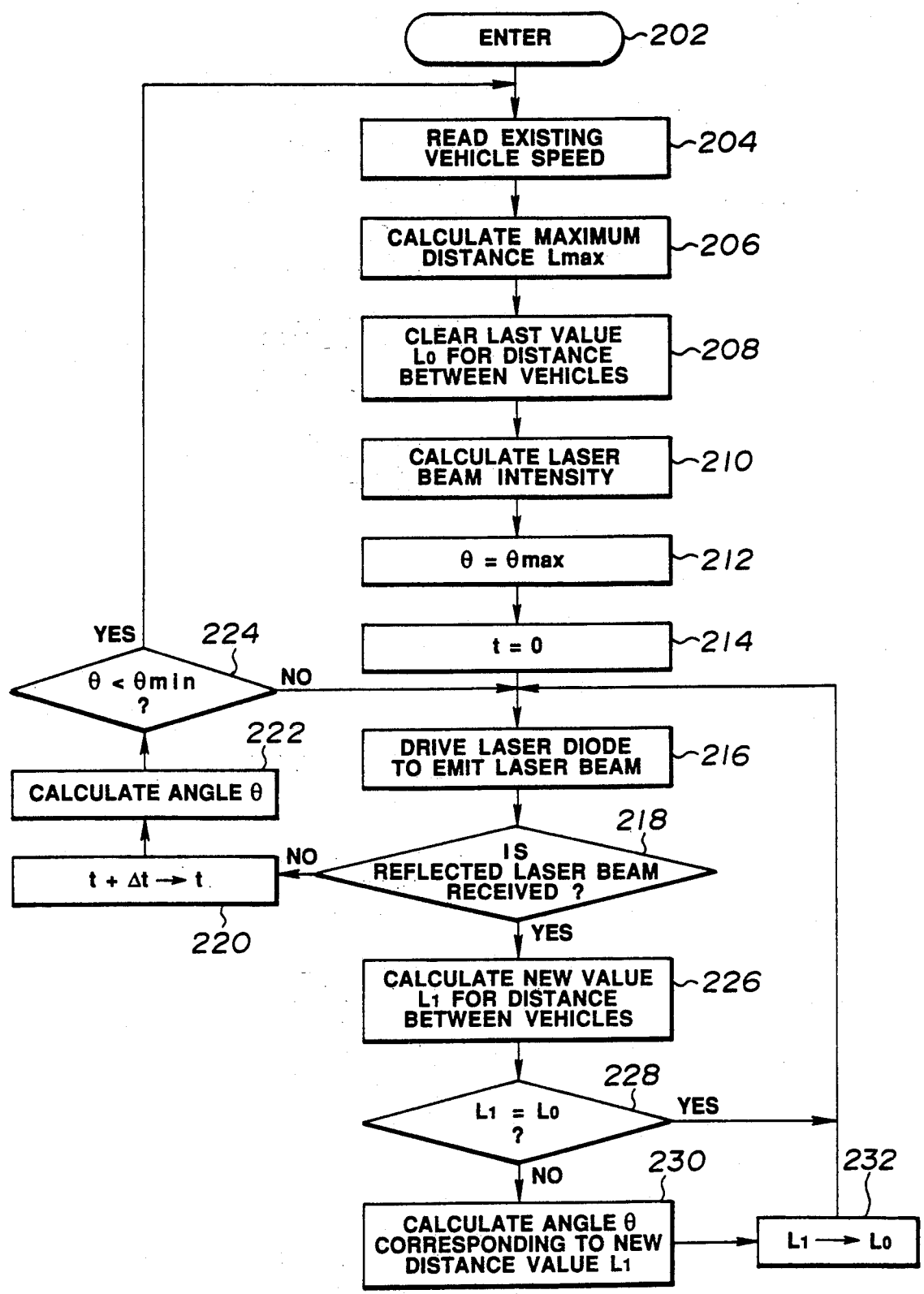
FIG. 2 is a flow diagram showing the programming of the digital computer used in the distance measuring apparatus of the invention.

FIG. 2 is a flow diagram illustrating the programming of the digital computer as it is used to control the distance measuring apparatus. The computer program is entered at the point 202. At the point 204 in the program, the central processing unit reads the existing vehicle running speed V into the computer memory. At the point 206 in the program, a maximum distance Lmax is calculated as a function of the read vehicle running speed V from the following equation:

$$Lmax = (V^2/\alpha) + V \cdot \tau$$

where $\alpha$ is the maximum possible deceleration of the vehicle, and $\tau$ is the average response time of the driver. Thus, the calculated maximum distance Lmax corresponds to the distance the vehicle runs after the application of emergency braking to the vehicle. At the point 208 in the program, the last value L0 calculated in the last cycle of execution of this program for the distance between the vehicle and the one in front is cleared.

At the point 210 in the program, the central processing unit calculates a value for the intensity of the laser radiation beam to be emitted from the laser diode 14. The calculated laser radiation beam intensity value may be a value at which the illuminated area has a width substantially equal to the width (for example, 2 meters) of the one in front spaced at the distance Lmax from the vehicle when the diverging angle $\theta$ is at its minimum value $\theta$min. At the point 212 in the program, the diverging angle $\theta$ is set at its maximum value $\theta$max (for example, 150 degrees). At the point 214 in the program, the timer 44 is cleared.

At the point 216 in the program, the central processing unit produces a command causing the drive circuit 12 to drive the laser diode 14 so as to produce a laser radiation beam having an intensity calculated at the point 210 by the central processing unit. The central processing unit also produces a command causing the electric motor 24 to move the cylindrical lens 18 with respect to the convex lens 16 so as to set the diverging angle $\theta$ at the value calculated by the central processing unit. At the point 218 in the program, a determination is made as to whether or not the second indication signal is received. If the answer to this question is "yes", then it means that the photosensor 34 receives the laser beam reflected from the vehicle in front and the program proceeds to the point 226. Otherwise, the program proceeds to the point 220.

At the point 220 in the program, the value t on the timer 44 is advanced by $\Delta t$. At the point 222 in the program, the diverging angle $\theta$ is calculated from the following equation:

$$\theta = \theta max - [(\theta max - \theta min)/T] \times t$$

where T is the period of time required for the diverging angle $\theta$ to move from its maximum value $\theta$max to its minimum value $\theta$min. Thus, the diverging angle $\theta$ decreases a predetermined value every time the program passes the point 220. At the point 224 in the program, a determination is made as to whether or not the existing diverging angle $\theta$ is less than the minimum value $\theta$min. If the answer to this question is "yes", then the program is returned to the point 204. Otherwise, the program is returned to the point 216.

At the point 226 in the program, the central processing unit reads the time period $\Delta T$ from the timer section 40 and the existing vehicle running speed V from the computer memory to calculate the distance L1 of the vehicle from the one in front. The calculated new distance value L1 is stored in the computer memory. At the point 228 in the program, a determination is made as to whether or not the calculated new distance value L1 is equal to the last distance value L0. If the answer to this question is "yes", then it means that the distance between the vehicle and the one in front is unchanged and the program is returned to the point 216. Consequently, the laser radiation beam is emitted from the laser diode 14 with the diverging angle $\theta$ being unchanged or set at the last value.

If the question inputted at the point 228 is "no", then it means that the distance between the vehicle and the one in front is changed and the program proceeds to the point 230 where the central processing unit set the diverging angle $\theta$ at a value corresponding to the calculated new distance value L1. At the point 232 in the program, the calculated new distance value L1 is used to update the last distance value L0 stored in the computer memory. Following this, the program is returned to the point 216.

Figure 3:
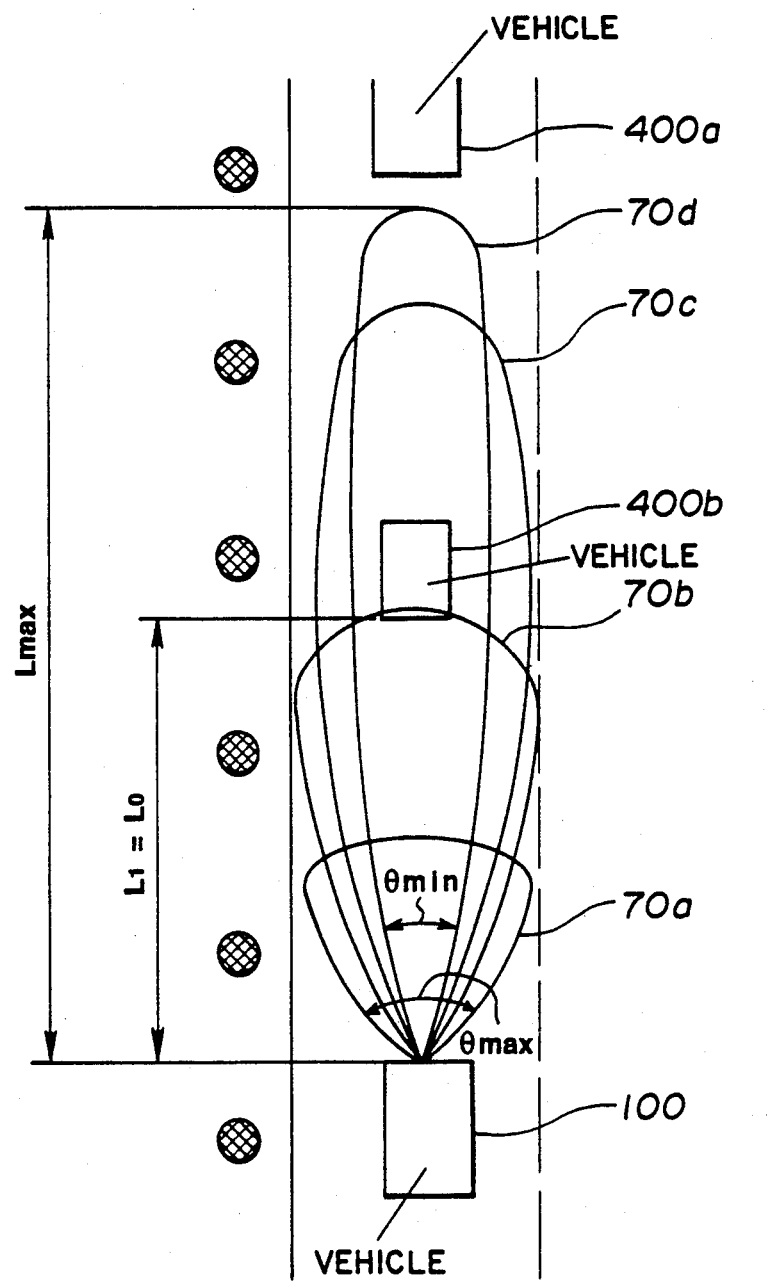
FIG. 3 is a diagram used in explaining the operation of the distance measuring apparatus controlled in accordance with the program of FIG. 2.

Referring to FIG. 3, the operation of the distance measuring apparatus of the invention will be described further. Assuming that the laser radiation beam emitted from the laser diode 14 has a constant intensity, the greater the diverging angle $\theta$, the smaller the range of the emitted laser radiation beam. When the vehicle 100 is spaced away from the one 400a in front at a distance greater than the maximum distance Lmax, the angle $\theta$ at which the laser radiation beam emitted from the laser diode 14 diverges changes from its maximum value $\theta$max to its minimum value $\theta$min in a plurality of stages to change the range of the emitted laser radiation beam in the following order: Ranges 70a, 70b, 70c and 70d. The range 70d corresponds to the maximum distance Lmax. After the emitted laser radiation beam has the range 70d, its range is returned to the range 70a.

When the vehicle 100 is spaced away from the one 400b in front at a distance less than the maximum distance Lmax, the angle $\theta$ at which the laser radiation beam emitted from the laser diode 14 diverges changes from its maximum value $\theta$max to an intermediate value to change the range of the emitted laser radiation beam from the range 70a to the range 70b. After the emitted laser radiation beam has the range 70b, the diverging angle $\theta$ is fixed at the intermediate value which corresponds to the range 70b. In this case, the laser radiation beam range changes with a change in the distance between the vehicle 100 and the one 400b in front.

Figure 4:
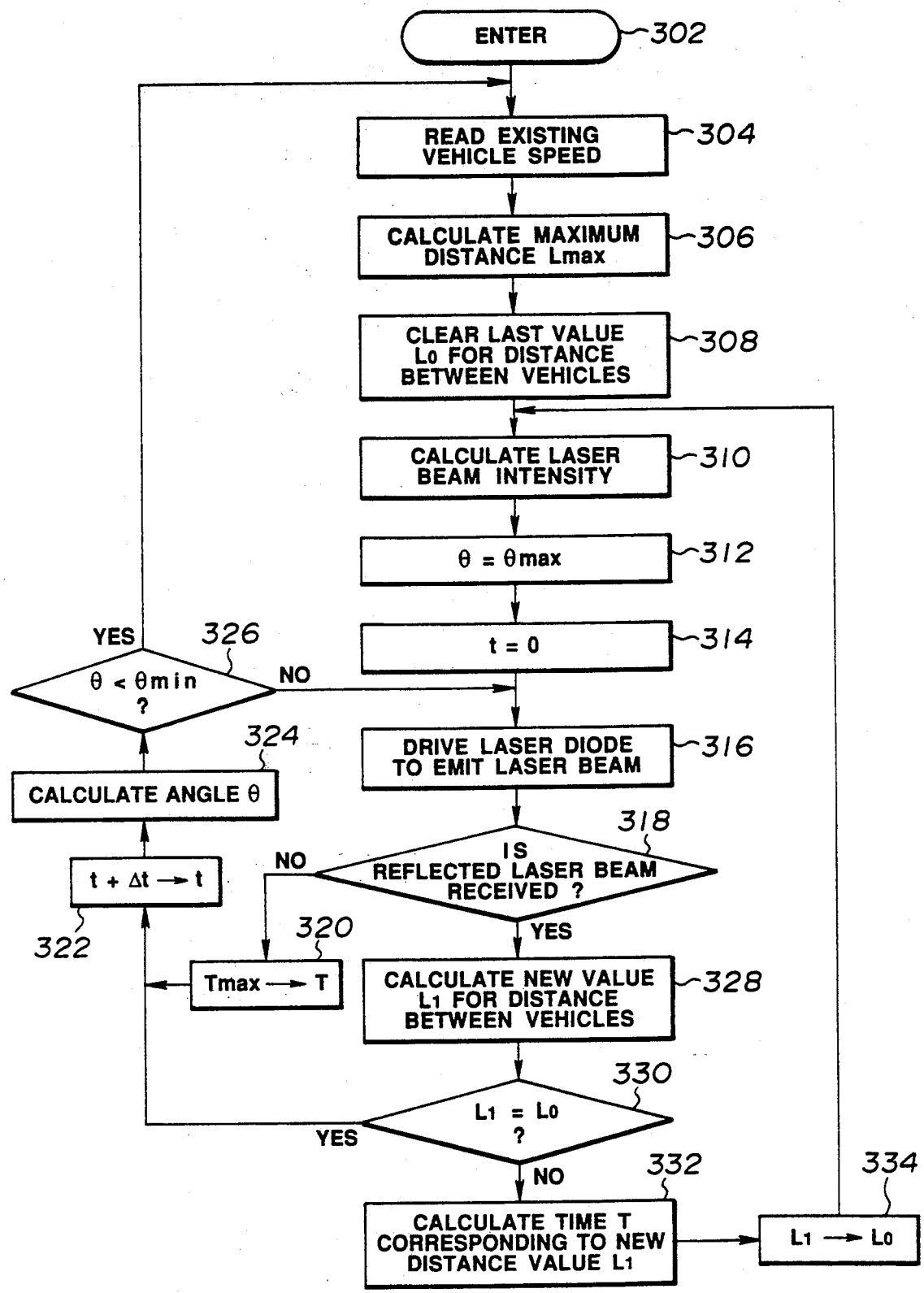
FIG. 4 is a flow diagram showing a modified form of the programming of the digital computer used in the distance measuring apparatus of the invention.

FIG. 4 is a flow diagram illustrating the programming of the digital computer as it is used to control the distance measuring apparatus. The computer program is entered at the point 302. At the point 304 in the program, the central processing unit reads the existing vehicle running speed V into the computer memory. At the point 306 in the program, a maximum distance Lmax is calculated as a function of the read vehicle running speed V from the following equation:

$$L\max = (V^2/\alpha) + V \cdot \tau$$

where $\alpha$ is the maximum possible deceleration of the vehicle, and $\tau$ is the average response time of the driver. Thus, the calculated maximum distance Lmax corresponds to the distance the vehicle runs after the application of emergency braking to the vehicle. At the point 308 in the program, the last value L0 calculated in the last cycle of execution of this program for the distance between the vehicle and the one in front is cleared.

At the point 310 in the program, the central processing unit calculates a value for the intensity of the laser radiation beam to be emitted from the laser diode 14. The calculated laser radiation beam intensity value may be a value at which the illuminated area has a width substantially equal to the width (for example, 2 meters) of the one in front spaced at the distance Lmax from the vehicle when the diverging angle $\theta$ is at its minimum value $\theta$min. At the point 312 in the program, the diverging angle $\theta$ is set at its maximum value $\theta$max (for example, 150 degrees). At the point 314 in the program, the timer 44 is cleared.

At the point 316 in the program, the central processing unit produces a command causing the drive circuit 12 to drive the laser diode 14 so as to produce a laser radiation beam having an intensity calculated at the point 310 by the central processing unit. The central processing unit also produces a command causing the electric motor 24 to move the cylindrical lens 18 with respect to the convex lens 16 so as to set the diverging angle $\theta$ at the value calculated by the central processing unit. At the point 318 in the program, a determination is made as to whether or not the second indication signal is received. If the answer to this question is "yes", then it means that the photosensor 34 receives the laser beam reflected from the vehicle in front and the program proceeds to the point 328. Otherwise, the program proceeds to the point 220.

At the point 320 in the program, the time T required for the diverging angle $\theta$ to change from its maximum value $\theta$max to its minimum value $\theta$min is set at its maximum value Tmax. At the point 322 in the program, the value t on the timer 44 is advanced by $\Delta t$. At the point 324 in the program, the diverging angle $\theta$ is calculated from the following equation:

$$\theta = \theta\max - [(\theta\max - \theta\min)/T] \times t.$$

Thus, the diverging angle $\theta$ decreases a predetermined value every time the program passes the point 220. At the point 326 in the program, a determination is made as to whether or not the existing diverging angle $\theta$ is less than the minimum value $\theta$min. If the answer to this question is "yes", then the program is returned to the point 304. Otherwise, the program is returned to the point 316.

At the point 328 in the program, the central processing unit reads the time period $\Delta T$ from the timer section 40 and the existing vehicle running speed V from the computer memory to calculate the distance L1 of the vehicle from the one in front. The calculated new distance value L1 is stored in the computer memory. At the point 330 in the program, a determination is made as to whether or not the calculated new distance value L1 is equal to the last distance value L0. If the answer to this question is "yes", then it means that the distance between the vehicle and the one in front is unchanged and the program is returned to the point 322.

If the question inputted at the point 228 is "no", then it means that the distance between the vehicle and the one in front is changed and the program proceeds to the point 332 where the central processing unit sets the time T at a value corresponding to the calculated new distance value L1. At the point 334 in the program, the calculated new distance value L1 is used to update the last distance value L0 stored in the computer memory. Following this, the program is returned to the point 310.

Figure 5:
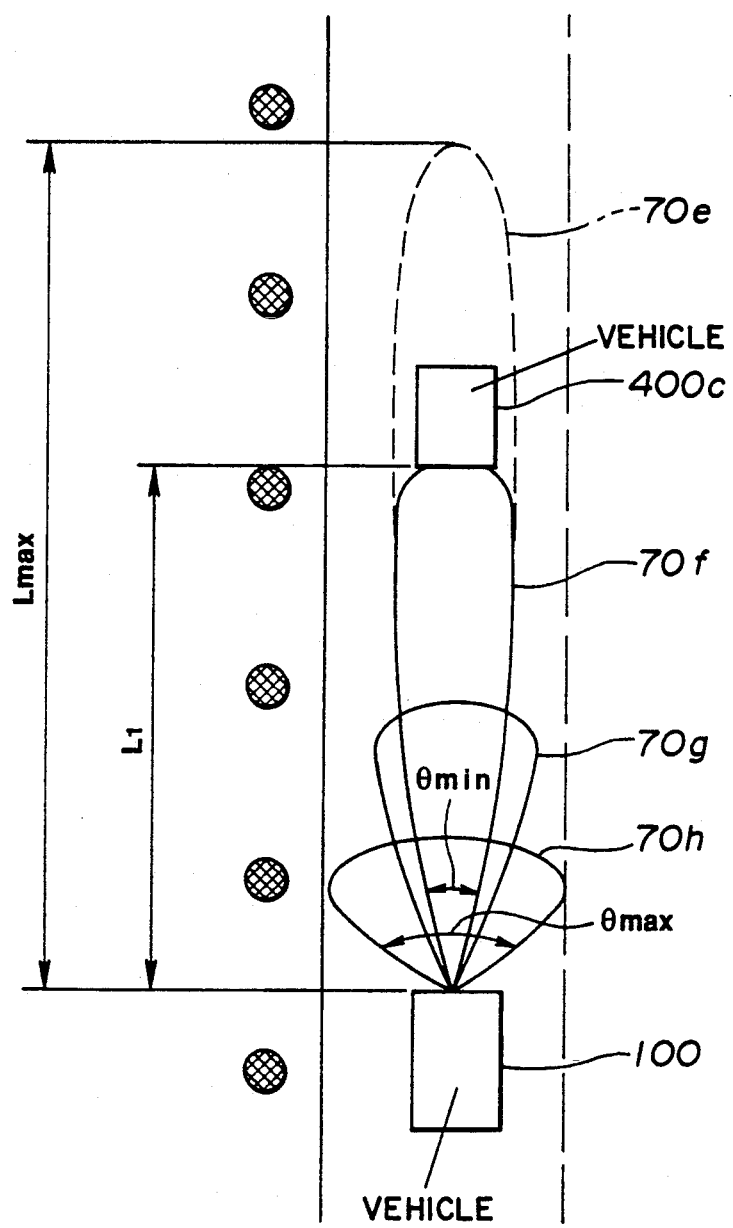
FIG. 5 is a diagram used in explaining the operation of the distance measuring apparatus controlled in accordance with the program of FIG. 4.

Referring to FIG. 5, the operation will be described further. In the absence of the second indication signal, the drive circuit 12 drives the laser diode 14 in a manner to emit a laser beam having an intensity capable of realizing the greatest range 70e of the emitted laser beam. The diverging angle $\theta$ changes with time from its maximum value $\theta$max to its minimum value $\theta$min in a plurality of stages to change the range of the emitted laser beam in the following order: Ranges 70h, 70g, 70f and 70a. The range 70e corresponds to the maximum distance Lmax. In this case, the period of time T required for the diverging angle $\theta$ to move from its maximum value $\theta$max to its minimum value $\theta$min is equal to its maximum value Tmax. After the emitted laser radiation beam has the range 70e, its range is returned to the range 70h.

In the presence of the second indication signal, the distance L1 between the vehicle 100 and the one 400c in front is calculated. The time period T required for the diverging angle $\theta$ to change from its maximum value $\theta$max to its minimum value $\theta$min is decreased to a value. This value is less than the maximum value Tmax and it corresponds to the calculated distance L1. The intensity of the emitted laser beam is set to realize the laser beam range 70f corresponding to the calculated distance L1 when the diverging angle $\theta$ is at its minimum value $\theta$. Thus, the diverging angle $\theta$ changes with time in a plurality of stages to change the emitted laser beam range in the following order: Ranges 70h, 70g and 70f.

This modification is effective to determine the distance between the vehicle and another vehicle overtaking the vehicle and it may be used along with the embodiment of FIG. 2.

What is claimed is:

1. A distance measuring apparatus installed on a car for measuring the distance of the car from the one in front, comprising:

a laser generator for emitting a laser beam;

means for detecting the laser beam reflected from the car in front;

means for calculating the distance between the cars when the photosensor receives the reflected laser beam; and a control unit coupled to the calculator for controlling an adjustable range of the emitted laser beam according to the calculated distance.

2. The distance measuring apparatus as claimed in claim 1, wherein the control unit includes means for controlling an angle at which the emitted laser beam diverges to control the adjustable range of the emitted laser beam.

3. The distance measuring apparatus as claimed in claim 2, wherein the control unit includes means for changing the angle in a plurality of stages from a maximum value to a minimum value until the photosensor receives the reflected laser beam.

4. The distance measuring apparatus as claimed in claim 3, wherein the control unit includes means for setting the angle at a value corresponding to the calculated distance when the calculated distance changes.

5. The distance measuring apparatus as claimed in claim 2, wherein the control unit includes means for changing the angle with time in a plurality of stage from a maximum value to a minimum value to change the emitted laser beam from a minimum range to a maximum range until the photosensor receives the reflected laser beam, and means for changing the angle with time in a plurality of stage from the maximum value to the minimum value to change the emitted laser beam from the minimum range to a range corresponding to the calculated distance.

6. The distance measuring apparatus as claimed in claim 2, wherein the control unit includes means for changing the angle from a maximum value to a minimum value for a predetermined period of time.

7. The distance measuring apparatus as claimed in claim 6, wherein the control unit includes means for setting the maximum value at the distance calculated when the photosensor receives the reflected laser beam.

* * * * *